US007555023B2

(12) United States Patent
Ell et al.

(10) Patent No.: US 7,555,023 B2
(45) Date of Patent: Jun. 30, 2009

(54) QUASI-SYNCHRONOUSLY PUMPED LASERS FOR SELF-STARTING PULSE GENERATION AND WIDELY TUNABLE SYSTEMS

(75) Inventors: Richard Ell, Belmont, MA (US); Franz X. Kaertner, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 56 days.

(21) Appl. No.: 11/448,408

(22) Filed: Jun. 7, 2006

(65) Prior Publication Data

US 2007/0002907 A1    Jan. 4, 2007

Related U.S. Application Data

(60) Provisional application No. 60/688,604, filed on Jun. 8, 2005.

(51) Int. Cl.
*H01S 3/098* (2006.01)
(52) U.S. Cl. .......................................... 372/18; 372/19
(58) Field of Classification Search .................... 372/18
See application file for complete search history.

(56) References Cited

U.S. PATENT DOCUMENTS

| 4,646,308 | A |   | 2/1987  | Kafka et al. |
| 4,815,080 | A | * | 3/1989  | Chesnoy et al. ............... 372/30 |
| 5,079,772 | A |   | 1/1992  | Negus et al. |
| 5,097,471 | A |   | 3/1992  | Negus et al. |
| 5,953,354 | A |   | 9/1999  | Staver et al. |
| 5,966,390 | A | * | 10/1999 | Stingl et al. .................... 372/18 |
| 6,618,423 | B1 | * | 9/2003 | Dekorsy et al. ................ 372/94 |
| 2002/0057723 | A1 | * | 5/2002 | Kleinschmidt ................ 372/57 |
| 2003/0156605 | A1 | * | 8/2003 | Richardson et al. ........... 372/25 |

OTHER PUBLICATIONS

Kamalov et al., "Femtosecond forsterite Kerr-lens mode-locked laser pumped synchronously by an Nd3+:YAG laser" Quantum Electronics, 2287, Jan. 1996, No. 1, New York, NY pp. 3-9.
Siders et al., "Self-Starting femtosecond pulse generation from a Ti:sapphire laser synchronously pumped by a pointing-stabilized mode-locked Nd:YAG laser" Review of Scientific Instruments, 1994 American Institute of Physics, No. 10, Oct. 1994, pp. 3140-3144.
Ell et al., "Generation of 5fs-pulses and octave-spanning spectra directly from a Ti:sapphire laser" Optics Letters, Mar. 15, 2001, vol. 26, No. 6, pp. 373-375.

(Continued)

*Primary Examiner*—Minsun Harvey
*Assistant Examiner*—Xnning Niu
(74) *Attorney, Agent, or Firm*—Gauthier & Connors LLP

(57) ABSTRACT

A laser system for generating self-starting few cycle laser pulses or widely tunable laser pulses is provided. The laser system includes a modelocked pump source that provides a pulsed pump signal. A gain medium receives the pulsed pump signal. A resonator structure includes the gain medium and a plurality of mirrors. The resonator structure defines a laser operated in a CW-modelocked regime generating few-cycle laser pulses having a duration less then 30 fs.

36 Claims, 4 Drawing Sheets

OTHER PUBLICATIONS

Borisevich et al., "Femtosecond pulsed formation dynamics and singularities of mode-locking in a pulsed synchronously pumped Ti:Sapphire laser", SPIE, vol. 3735, pp. 30-33.

Ell et al., "Quasi-synchronous pumping of modelocked few-cycle Titanium Sapphire lasers" Optics Express, Nov. 14, 2005, vol. 13, No. 23, pp. 9292-9298.

Tandon et al., "Large-area broadband saturable Bragg reflectors by use of oxidized AlAs" Optical Society of America, 2004, Optics Letters, vol. 29, No. 21, pp. 2551-2553.

Spielmann et al., "Femtosecond pulse generation from a synchronously pumped Ti:sapphire laser" Optical Society of America, 1991, Optics Letters, vol. 16, No. 15, pp. 1180-1182.

Siders et al., "Self-starting femtosecond pulse generation from Ti:sapphire laser synchronously pumped by a pointing-stabilized mode-locked Nd: YAG laser" 1994 American Institute of Physics, vol. 65, No. 10 pp. 3140-3144.

Ell et al., "Generation of 5-fs pulses and octave-spanning spectra directly from Ti sapphire laser" Optics Letters, 2001, vol. 26, No. 6, pp. 373-375.

Fluck et al., " Broadband saturable absorber for 10-fs pulse generation" Optics Letters, 1996, vol. 21, No. 10, pp. 743-745.

Tsuda et al., "Mode-Locking Ultrafast Solid-State Lasers with Saturable Bragg Reflectors" Journal of Selected Topics in Quantum Electronics, vol. 2, No. 3, pp. 454-464.

\* cited by examiner

QUASI-SYNCHRONOUSLY PUMPED LASERS FOR SELF-STARTING PULSE GENERATION AND WIDELY TUNABLE SYSTEMS

PRIORITY INFORMATION

This application claims priority from provisional application Ser. No. 60/688,604 filed Jun. 8, 2005, which is incorporated herein by reference in its entirety.

This invention was made with government support awarded by the U.S. Navy under Grant Number N00014-02-1-0717. The government has certain rights in the invention.

BACKGROUND OF THE INVENTION

The invention relates to the field of mode-locking, and in particular to a self-starting quasi-synchronously pumped Kerr-lens modelocked laser.

Dispersion managed Kerr-lens modelocked (DM-KLM) Titanium-Sapphire (Ti:sapphire) lasers are the work horses in the domain of sub-30 fs laser pulses. Since the first observation of Kerr-lens modelocking (KLM), continuous laser development has led to the generation of octave-spanning spectra and 5 fs pulses directly from the oscillator. DM-KLM lasers exploit the intensity dependent nonlinear refractive index in conjunction with a careful management of the distribution of discrete dispersive elements inside the cavity. In the time domain, this leads to self-phase modulation and hence additional spectral broadening, whereas in the transverse spatial beam dimensions, the build-up of a Kerr-lens together with a suitable resonator geometry enables efficient gain modulation to favor pulsed operation in comparison to continuous wave (CW) operation. However, KLM lasers with pulse durations below a few tens of femtoseconds, i.e. the few-cycle regime, are generally not self-starting and usually require external perturbations to initiate modelocking.

Though KLM allows for a large modulation of the effective gain up to several tens of percent, it is generally not self-starting. A parameter that characterizes the self-starting ability is the so-called modelocking driving force and is defined as $(d(\Delta g)/dI)$ for $I \rightarrow 0$, with I the intensity and $\Delta g$ the gain modulation. In sub-10 fs lasers (less than four optical cycles), the modelocking driving force is designed to be small in order not to overdrive the KLM when the laser transitions from continuous wave operation to pulsed operation.

So far, three different approaches have been presented to overcome the self-starting problem in KLM lasers. One approach is to maximize the modelocking driving force by proper cavity alignment. A particular resonator design enables a maximization of the nonlinear mode variation and consequently dynamic loss modulation, achieving self-starting in a KLM Ti:sapphire when operating close enough to the stability edge. This is only possible down to pulse durations of about 20-40 fs until KLM is overdriven, resulting in a non-continuous modelocking. This means that the nonlinearity in the laser crystal becomes excessive and leads to multiple pulsing and/or modelocked Q-switching.

Alternatively, one can use a semiconductor saturable absorber mirror (SESAM) or saturable Bragg reflector (SBR) inside the cavity. The laser then exhibits self-starting modelocking because SESAMs/SBRs provide large modelocking driving forces in the initial pulse build-up phase. Saturation of the SBR after pulse build-up doesn't harm the laser dynamics, because KLM is taking over the pulse shaping. Another advantage of this method is a relaxed cavity alignment in contrast to purely DM-KLM lasers. A drawback is the bandwidth limitation introduced by these devices that can only be overcome by using non-conventional fabrication procedures which are still under development A third approach to attain self-starting DM-KLM is (quasi-) synchronous pumping. The term "quasi" accounts for the fact that precise synchronization of the Ti:sapphire laser is not necessary. Self-starting 30 fs pulses with quasi-synchronous pumping have been demonstrated earlier, 30 fs correspond to more than 10 optical cycles at Ti:sapphire wavelength.

SUMMARY OF THE INVENTION

According to one aspect of the invention, there is provided a laser system generating self-starting few cycle laser pulses or widely tunable laser pulses. The laser system includes a modelocked pump source that provides a pulsed pump signal. A gain medium receives the pulsed pump signal. A resonator structure includes the gain medium and a plurality of mirrors. The resonator structure defines a laser operated in a CW-modelocked regime generating few-cycle laser pulses having a duration less then 30 fs.

According to one aspect of the invention, there is provided a method of generating self-starting few cycle laser pulses or widely tunable laser pulses. The method includes providing a modelocked pump source that provides a pulsed pump signal. A gain medium receives the pulsed pump signal. A resonator structure includes the gain medium and a plurality of mirrors. Also, the method includes forming a resonator structure that includes the gain medium and a plurality of mirrors. The resonator structure defines a laser operated in a CW-modelocked regime generating few-cycle laser pulses having a duration less then 30 fs.

DETAILED DESCRIPTION OF THE INVENTION

The invention involves modelocking dynamics of quasi-synchronously pumped, dispersion managed Kerr-lens modelocked Titanium-Sapphire lasers. For the first time, self-starting few-cycle laser pulses with 6 fs pulse duration, corresponding to almost two optical cycles, and ultrabroadband optical spectra are demonstrated without using any intracavity elements like saturable absorbers.

Figure 1:
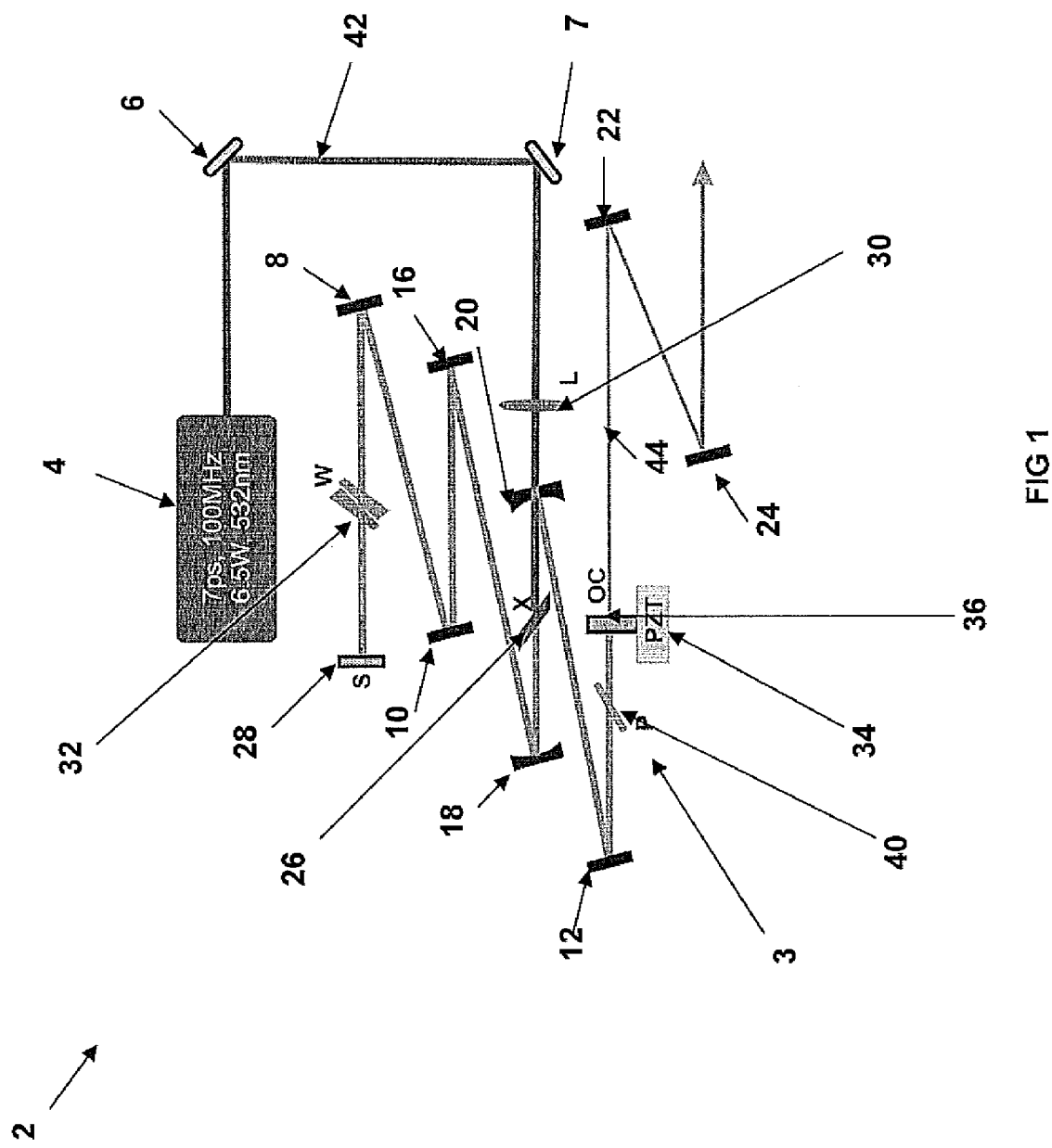
FIG. 1 is a schematic diagram illustrating a quasi-synchronously pumped Titanium-Sapphire laser.

The arrangement for an inventive quasi-synchronously pumped laser 2 is depicted in FIG. 1. A pump source 4 is a frequency doubled (532 nm), picosecond (7 ps), saturable absorber mirror modelocked Nd:YVO$_4$ laser delivering up to 6.5 W of pump power at a repetition rate of 100 MHz and with a diffraction limited beam $M^2 \leq 1.2$. Moreover, the quasi-synchronous laser 2 includes a resonator structure 3 and a gain medium 26 comprising Ti:sapphire laser crystal having a 2 mm path length. The resonator structure 3 includes dispersion compensating mirrors 8-20 thereof two concave mirrors 18 and 20, a silver mirror 28, $BaF_2$ glass wedges 32, a $BaF_2$ glass plate 40, an output coupler 36, a piezo controlled mirror mount 34, and a pump lens 30. All of these reflective elements form a closed optical path. The gain medium 26 is positioned in the optical path. The resonator external mirrors 22, 24 are for external dispersion compensation before pulse duration measurements and and are not essential to the invention.

The pump source 4 outputs a CW-modelocked and hence pulsed pump beam 42 and the lens 30 focuses the modelocked pump beam 42 into the gain medium 26 or Ti:sapphire laser crystal, which produces a CW-modelocked output 44. The concave mirrors 18, 20 are positioned in the quasi-synchronous laser 2 to provide the output 44 of the Ti:sapphire laser crystal 26 to the optical output coupler 36. The output 44 from the output coupler 36 is guided out from the quasi-synchronous laser 2 using the mirrors 22 and 24. The resonator structure 3 is a compact, z-folded, prism-less oscillator with broadband optics for octave-spanning spectra. To control the resonator length of the resonator structure 3, the optical coupler 36 was mounted on the piezo controlled mirror mount 34.

After manually equalizing the resonator length of the resonator structure 3 to the repetition frequency of the pump source, which is approximately 100 MHz, the quasi-synchronously pumped laser resonator 3 immediately starts Kerr-lens CW-modelocking, when the cavity is optimized beforehand for KLM operation. In terms of cavity alignment to geometrically optimize the resonator for efficient KLM, there is no difference between traditional continuous wave pumping and quasi synchronous pumping with a modelocked source 4. Changing the total intracavity dispersion by moving or completely removing the wedges and the plate one can have access to different pulse duration regimes and observe reliable self-starting behavior for CW-modelocked 100 fs pulses down to 6 fs pulses and ultrabroadband spectra.

In the sub-10 fs regime of interest, a typical relative cavity detuning between the modelocked pump source 4 and the modelocked laser 3 of about +/−5 μm, corresponding to +/−150 Hz, is tolerated while still maintaining self-starting CW-modelocking of laser 3. Both lasers are built on water-cooled breadboards and therefore the passive stability is sufficient to keep the lasers within the self-starting range for many hours without cavity length adjustments.

To study the transition dynamics from CW operation to CW-modelocked operation, a chopper wheel was inserted into the intracavity beam of the Ti:sapphire laser 3. The average fundamental power of the Ti:sapphire laser 3 was detected with a photodetector (10 MHz bandwidth) as well as the second-harmonic power when the Ti:sapphire laser is CW-modelocked (~1 GHz bandwidth).

The signals are analyzed using a 1.5 GHz LeCroy oscilloscope. Both traces are given in FIG. 2A where noise dominantly arises from aliasing problems of the digital oscilloscope. The orange upper trace represents the fundamental power and the blue trace below is the second-harmonic (SH) power of the Ti:sapphire laser 3. Since the detector for the fundamental power is slow, the signal shows an average over the individual laser pulses.

Figures 2A, 2B:
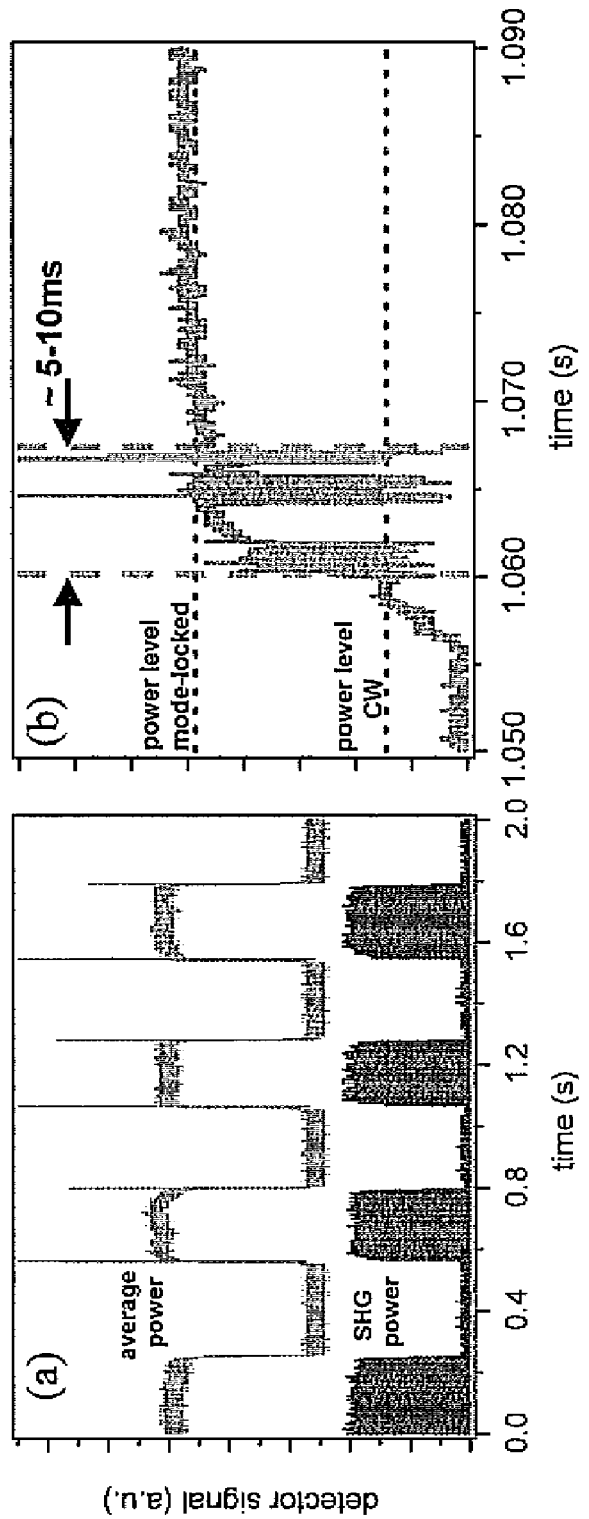
FIG. 2A is a graph illustrating the fundamental and second harmonic average power of the self-starting modelocked Ti:sapphire laser with a chopper wheel in the intracavity beam illustrating the fast and reliable self-starting behavior.
FIG. 2B is a graph illustrating the magnification of the temporal evolution of the fundamental average power.

The graph illustrates reliable self-starting behavior. FIG. 2B shows a closer look on the temporal evolution of the fundamental laser power of the Ti:sapphire laser 3 and reveals some detail on the complex laser dynamics that occurs during the build-up of the 6 fs pulse from the continuous wave running laser over a time span of about 5-10 ms. This is about one to two orders of magnitude slower than typical build-up times for standard KLM lasers or SESAM/SBR modelocked lasers. When the quasi synchronously pumped system 2 is operated near the edge of the self-starting limits, the self-starting becomes unreliable and stochastic with respect to build-up time.

When using longer pump pulses from pump laser 4 on the order of several 10 ps to 100 ps, one expects the self-starting behavior of laser 3 to be roughly the same. This is due to the fact that the initial build-up of a pulse is a kind of active modelocking stemming from the periodic and fast gain modulation by the pump pulses. Since the pulse shaping in an actively modelocked laser only weakly depends on the curvature of the loss/gain modulation, self-starting will only cease when approaching the CW pump regime, for example, for nanosecond and longer pulse durations.

For the quasi-synchronous pumping of laser 2 it is important to characterize the output power modulation induced by the mismatch of the pulse repetition rates of the two lasers. When the repetition frequencies are manually adjusted to be equal, no modulation in the output power is observed. If the lasers 2 and 4 are not synchronous the output power of the Ti:sapphire will be modulated with the difference frequency of the repetition rates of both lasers.

Figure 3:
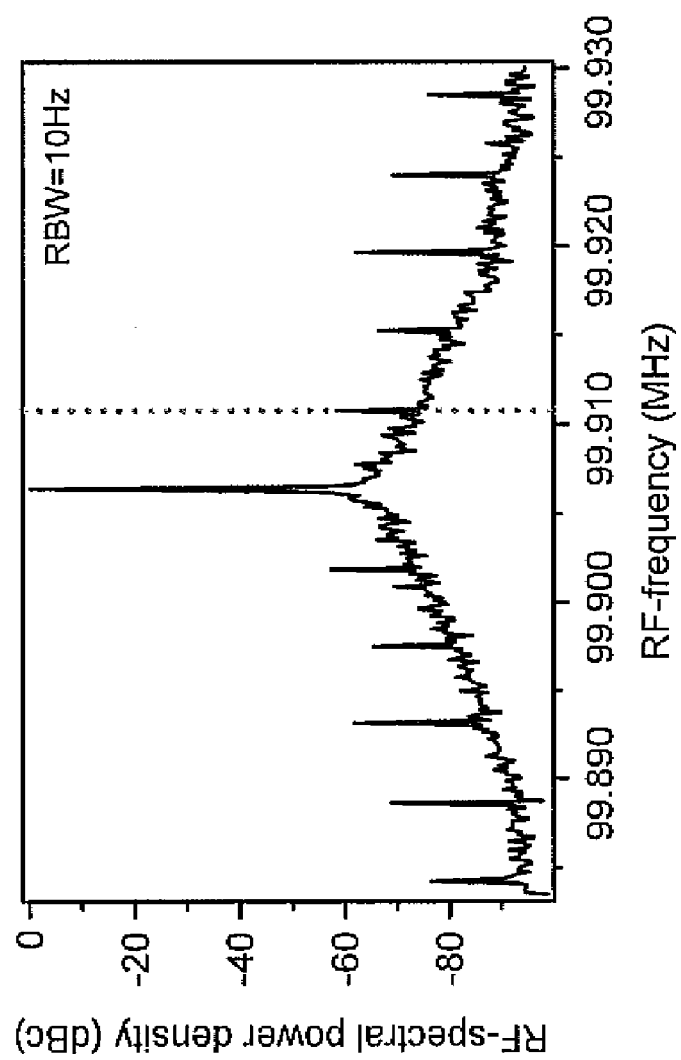
FIG. 3 is a graph demonstrating the radio-frequency spectrum of the quasi-synchronously pumped Ti:sapphire; with a detuning of pump laser and Ti:sapphire of 5 kHz.

FIG. 3 illustrates the RF power spectrum of the Ti:sapphire laser 3 with a pump detuning of 5 kHz. It shows side-bands slightly below −60 dBc resulting in a 0.1% power modulation of the optical output. This 60 dB suppression is observable over a wide detuning range from within the self-starting limits up to several MHz. The overall amplitude noise of the Ti:sapphire laser 3 was measured with a vector signal analyzer and the RMS noise was determined to be 0.28% (from 0.1 Hz to 10 MHz) which is dominated by the noise of pump laser (0.39% from 0.1 Hz to 10 MHz).

Figures 4A, 4B:
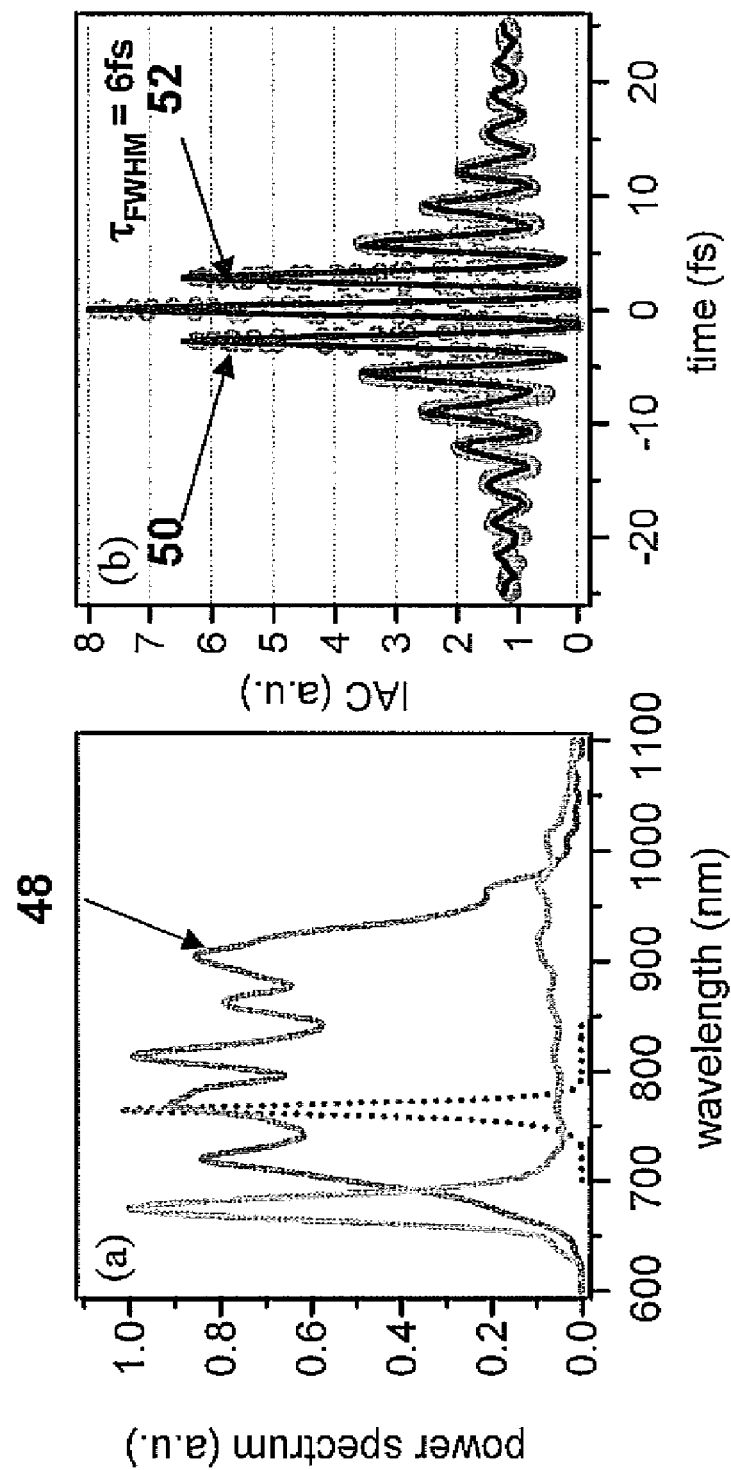
FIG. 4A is a graph demonstrating the measured optical power spectra displaying the wide self-starting range.
FIG. 4B is a graph demonstrating the measured (and calculated interferometric autocorrelation traces revealing a pulse duration of 6 fs.

In this mode of operation, the laser 3 produces a clean train of CW-modelocked pulses characterized by its spectrum and interferometric autocorrelation (IAC). FIG. 4A shows several spectra for which self-starting Kerr-lens modelocking is observed, from a narrow bandwidth (tunable) 100 fs pulse to ultrabroadband spectra, important for a direct and simple carrier-envelope offset frequency stabilization scheme. The spectrum for which the IAC was measured is represented by the curve 48 and has a FWHM bandwidth of 230 nm, with an average power of typically 150 mW at 5 W pump power from pump source 4.

The measured IAC of the modelocked laser pulses 44 emitted by laser 3 is represented in FIG. 4B by the curve 50. The measured IAC and the corresponding spectrum are used in a phase retrieval algorithm that optimizes the spectral phase to match the calculated IAC with the measured IAC. The curve 52 on top of the measurement data is the calculated IAC, which fits the measurement very well and corresponds to a pulse duration of 6 fs.

There are plenty of benefits for the quasi-synchronous pumping scheme in terms of a universal self-starting behavior for Kerr-lens modelocking and low residual output power modulation. Self-starting of widely tunable CW-modelocked pulses of about 100 fs duration down to 6 fs pulses and ultrabroadband spectra have been shown. Pumping with a 100 MHz picosecond source 4, one can observe a −30 dBc residual optical power modulation when both lasers are not perfectly synchronized. These proof-of-principle experiments open up the possibility of a more general use of CW-modelocked lasers to pump few-cycle femtosecond oscillators. Not only do CW-modelocked pump lasers potentially offer advantages in terms of reduced system complexity and cost (because of the ease of single-pass external doubling) but a completely modelocked and synchronized pump-oscillator system can also prove high value for pump-probe experiments, optical frequency metrology and phase controlled few-cycle laser pulses.

Synchronous or quasi-synchronous pumping has many interesting applications. First of all, self-starting Kerr-lens modelocking is achieved, which is most important when considering the poor starting performance of high-repetition rate DM-KLM lasers. For repetition frequencies of several hundred MHz up to a few GHz, synchronous pumping will significantly improve the starting behavior. The invention allows pumping at a sub-harmonic of the fundamental repetition frequency of the laser 3 still leading to self-starting of the DM-KLM process. The residual output power modulation is only on the order of −30 dBc and can even be reduced further by pumping with a higher repetition rate source due to stronger filtering of the gain medium 26.

Active synchronization of the modelocked pump source 4 and the laser 3 completely removes the residual output power modulation and is very appealing for many pump-probe experiments because the system simultaneously delivers timing controlled and modelocked femtosecond near-IR pulses, picosecond green pulses and picosecond IR pulses. In the context of the emerging field of optical frequency metrology, phase-synchronized modelocked pump sources 4 and (Ti: sapphire) lasers 3 offer exciting new perspectives by accessing new spectral regions not yet covered by phase-controlled frequency-combs. In the invention, phase-synchronization of the picosecond Nd:YVO$_4$ laser 4 with the DM-KLM Ti:sapphire laser 3 is facilitated by the fact that the broadband sub-10 fs pulses have enough optical power at the wavelength of the picosecond laser, around 1064 nm.

An interference experiment of the two synchronized lasers 4 and 3 provides the difference of the two carrier-envelope offset frequencies. Together with the appropriate scheme for the control of the carrier-envelope offset frequency of the Ti:sapphire laser 3 and a suitable feedback loop, one is readily able to provide fully phase-coherent mode-combs form lasers 3 and 4 for time domain applications and frequency metrology, either by using the available wavelength ranges directly or by extending the mode-combs to the IR or visible spectral regions by nonlinear frequency mixing. The attractiveness of this approach lies in the fact that by using a modelocked ps-pump laser 4, one can pump the (Ti:sapphire) laser 3 and simultaneously use the pump laser 4 for doing experiments in optical frequency metrology. In comparison to the coupling of two independent lasers, this scheme is economically more viable.

Although the present invention has been shown and described with respect to several preferred embodiments thereof, various changes, omissions and additions to the form and detail thereof, may be made therein, without departing from the spirit and scope of the invention.

What is claimed is:

1. A laser system generating self-starting few cycle laser pulses or widely tunable laser pulses comprising:
    a modelocked pump source that provides a pulsed pump signal;
    a gain medium that receives said pulsed pump signal; and
    a resonator structure that includes the gain medium and a plurality of mirrors including wedges and plates, said resonator structure defines a laser operated in a CW-modelocked regime generating few-cycle laser pulses having a duration less then 10 fs, wherein the length of said resonator structure is controlled by an optical coupler being mounted on a piezo controlled mirror mount and includes a broadband optics for octave-spanning spectra, the total intracavity dispersion of said resonator is changed by moving or completely removing one or more wedges and a plate so as to access different pulse duration regimes and observe reliable self-starting behavior for CW-modelocked pulses down to 6 fs.

2. The laser system of claim 1 wherein said modelocking of the resonator structure is achieved by Kerr-lens modelocking.

3. The laser system of claim 2, wherein said modelocked pump source and said resonator structure comprises repetition frequencies that are approximately equal leading to self-starting Kerr-lens modelocking.

4. The laser system of claim 3, wherein said self-starting occurs for pulse durations from 1 cycle to approximately 10 cycles of the center wavelength of the gain medium.

5. The laser system of claim 3, wherein said self-starting occurs for widely tunable pulses up to 100 fs.

6. The laser system of claim 1, wherein said modelocked pump source and resonator structure are actively synchronized.

7. The laser system of claim 1, wherein said pump source comprises a repetition rate of approximately a multiple or a sub-multiple of the resonator structure repetition frequency leading to self-starting Kerr-lens modelocking.

8. The laser system of claim 7, wherein said modelocked pump source and resonator structure is actively synchronized.

9. The laser system of claim 1, wherein said modelocked pump source comprises a frequency doubled Neodymium or Ytterbium doped solid-state or fiber laser, such as a Nd:YVO$_4$-laser or a Yb-fiber laser.

10. The laser system of claim 1, wherein said gain medium comprises a Ti:sapphire laser crystal.

11. The laser system of claim 1, wherein said pulsed pump signal is focused into said gain medium using a lens.

12. The laser system of claim 1, wherein said resonator structure comprises wedges of a transparent material to tune the dispersion of said resonator structure.

13. The laser system of claim 1, wherein said resonator structure comprises a transparent plate as part of resonator dispersion management of said resonator structure.

14. The laser system of claim 3, wherein the common repetition frequency of the modelocked pump source and the resonator structure is 100 MHz.

15. The laser system of claim 1, wherein said output signal is guided out of said laser system using said output coupler.

16. The laser system of claim 3, wherein said repetition frequencies are adjusted using one resonator mirror or the output coupler mounted on a piezo controlled mirror mount either in the said pump source or the said resonator structure.

17. The laser system of claim 15, wherein said wedges comprise BaF$_2$.

18. The laser system of claim 15, wherein said plate comprises BaF$_2$.

19. A method of generating self-starting few cycle laser pulses or widely tunable laser pulses comprising:
    providing a modelocked pump source that provides a pulsed pump signal;
    receiving said pulsed pump signal through a gain medium; and
    forming a resonator structure that includes the gain medium and a plurality of mirrors including wedges and plates, said resonator structure defines a laser operated in a CW-modelocked regime generating few-cycle laser pulses having a duration less then 10 fs, wherein the length of said resonator structure is controlled by an optical coupler being mounted on a piezo controlled mirror mount and includes a broadband optics for octave-spanning spectra, the total intracavity dispersion of said resonator is changed by moving or completely removing one or more wedges and a plate so as to access different pulse duration regimes and observe reliable self-starting behavior for CW-modelocked pulses down to 6 fs.

20. The method of claim 19 wherein said modelocking of the resonator structure is achieved by Kerr-lens modelocking.

21. The method of claim 20, wherein said modelocked pump source and said resonator structure comprises repetition frequencies that are approximately equal leading to self-starting Kerr-lens modelocking.

22. The method of claim 21, wherein said self-starting occurs for pulse durations from 1 cycle to 10 cycles of the center wavelength of the gain medium.

23. The method of claim 21, wherein said self-starting occurs for widely tunable pulses up to 100 fs.

24. The method of claim 19, wherein said modelocked pump source and resonator structure is actively synchronized.

25. The method of claim 19, wherein said pump source comprises a repetition rate of approximately a multiple or a sub-multiple of the resonator structure repetition frequency leading to self-starting Kerr-lens modelocking.

26. The method of claim 7, wherein said modelocked pump source and resonator structure are actively synchronized.

27. The method of claim 19, wherein said modelocked pump source comprises a frequency doubled Neodymium or Ytterbium doped solid-state or fiber laser, such as a Nd:YVO$_4$-laser or a Yb-fiber laser.

28. The method of claim 19, wherein said gain medium comprises a Ti:sapphire laser crystal.

29. The method of claim 19, wherein said pulsed pump signal is focused into said gain medium using a lens.

30. The method of claim 19, wherein said resonator structure comprises wedges of a transparent material to tune the dispersion of said resonator structure.

31. The method of claim 19, wherein said resonator structure comprises a transparent plate as part of resonator dispersion management of said resonator structure.

32. The method of claim 21, wherein the common repetition frequency of the modelocked pump source and the resonator structure is 100 MHz.

33. The method of claim 19, wherein said output signal is guided out of said laser system using an output coupler.

34. The method of claim 21, wherein said repetition frequencies are adjusted using one resonator mirror or the output coupler mounted on a piezo controlled mirror mount either in the said pump source or the said resonator structure.

35. The method of claim 33, wherein said wedges comprise BaF$_2$.

36. The method of claim 33, wherein said plate comprises BaF$_2$.

* * * * *